United States Patent
Soman et al.

(10) Patent No.: US 11,550,922 B2
(45) Date of Patent: Jan. 10, 2023

(54) SECURE VIRTUAL DESKTOPS AND VIRTUAL APPLICATIONS WITH ANTI-KEYLOGGING CAPABILITIES

(71) Applicant: VMware, Inc., Palo Alto, CA (US)

(72) Inventors: Sisimon Soman, Sunnyvale, CA (US); Anurag Katiyar, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 284 days.

(21) Appl. No.: 16/743,973

(22) Filed: Jan. 15, 2020

(65) Prior Publication Data
US 2021/0216644 A1  Jul. 15, 2021

(51) Int. Cl.
G06F 21/57 (2013.01)
H04L 9/30 (2006.01)
G06F 9/4401 (2018.01)

(52) U.S. Cl.
CPC .......... G06F 21/577 (2013.01); G06F 9/4411 (2013.01); H04L 9/30 (2013.01); H04L 2209/16 (2013.01)

(58) Field of Classification Search
CPC ...... G06F 21/83; G06F 21/577; G06F 9/4411; H04L 9/30; H04L 2209/16
See application file for complete search history.

(56) References Cited

U.S. PATENT DOCUMENTS

| | | | |
|---|---|---|---|
| 9,317,701 B2 † | 4/2016 | Waterson | |
| 2007/0182714 A1* | 8/2007 | Pemmaraju | G06F 21/602 345/168 |
| 2010/0195825 A1* | 8/2010 | Cini | G06F 21/83 380/52 |
| 2012/0079282 A1* | 3/2012 | Lowenstein | G06F 21/82 713/189 |
| 2016/0371472 A1* | 12/2016 | Walsh | G06F 21/10 |
| 2017/0104597 A1* | 4/2017 | Negi | H04L 9/0825 |
| 2017/0286141 A1* | 10/2017 | Adler | G06F 9/4856 |
| 2018/0026947 A1* | 1/2018 | Haworth | H04L 63/06 713/168 |
| 2019/0370013 A1* | 12/2019 | Katchapalayam | G06F 21/6218 |

(Continued)

FOREIGN PATENT DOCUMENTS

| | | | | |
|---|---|---|---|---|
| KR | 2002-0048313 A | * | 6/2002 | G06F 15/00 |
| KR | 2004-0009575 A | * | 1/2004 | G06F 15/00 |
| WO | WO-2018078212 A1 | * | 5/2018 | G06F 21/566 |

OTHER PUBLICATIONS

"WM_SetFocus message"; https://docs.microsoft.com/en-us/windows/desktop/inputdev/wm-setfocus; May 31, 2018; retrieved on Mar. 2, 2020.

(Continued)

*Primary Examiner* — David J Pearson

(57) ABSTRACT

Systems and methods are described for providing ways to protect client devices in communication with virtual desktops and virtual applications from keylogging attacks. A keyboard filter driver obfuscates scancodes from key presses produced on the keyboard of the client device so that malicious keylogging or keyboard hooking software is not able to observe user inputs. The obfuscated scancodes are conveyed and de-obfuscated before being applied in the virtual desktop or virtual application.

20 Claims, 4 Drawing Sheets

(56) References Cited

U.S. PATENT DOCUMENTS

2020/0104538 A1* 4/2020 Summers .............. G06F 21/602

OTHER PUBLICATIONS

"Virtual-Key Codes"; https://docs.microsoft.com/en-us/windows/desktop/inputdev/virtual-key-codes; May 31, 2018; retrieved on Mar. 2, 2020.

"Window Messages"; https://docs.microsoft.com/en-us/windows/desktop/learnwin32/window-messages; May 31, 2018; retrieved on Mar. 2, 2020.

"WM_KeyDown message"; https://docs.microsoft.com/en-us/windows/desktop/inputdev/wm-keydown; May 31, 2018; retrieved on Mar. 2, 2020.

"WM_KillFocus message"; https://docs.microsoft.com/en-us/windows/desktop/inputdev/wm-killfocus; May 31, 2018; retrieved on Mar. 2, 2020.

\* cited by examiner
† cited by third party

SECURE VIRTUAL DESKTOPS AND VIRTUAL APPLICATIONS WITH ANTI-KEYLOGGING CAPABILITIES

TECHNICAL FIELD

The present disclosure generally relates to virtual desktop infrastructure and more specifically to techniques for enhancing security of virtual applications and virtual desktops with anti-keylogging capabilities.

BACKGROUND

Virtual desktops and virtual applications are becoming more and more commonplace in today's enterprise work environments. The security of having a remotely stored desktop or application, ability to access the desktop or application from any location and on any device, centralized management, efficient use of hardware resources, as well as numerous other benefits made possible by virtualization technology is a large benefit for many organizations.

In a conventional virtual desktop or virtual application environment, a user is provisioned a virtual desktop or application and can access the virtual desktop or application over a remote network connection, such as a WAN connection. The virtual desktops and applications are typically hosted on servers that reside in a data center of the enterprise or a third-party service provider, and each host server may execute multiple virtual desktops and/or applications. Users can utilize a client device to remotely log into a virtual desktop or application and all of the desktop/application execution takes place on the remote host server that is linked to the local client device over a network using a remote display protocol, such as remote desktop protocol (RDP), PC-over-IP protocol (PCoIP), virtual network computing (VNC) protocol, or the like. Using the remote desktop protocol, the user can interact with the desktop or application running on the remote host server, with only the display, keyboard, and mouse information communicated with the local client device.

Particularly in industries where security is a priority, such as banking, medicine, etc., virtual desktops and applications have the benefit of an additional level of security not afforded by traditional, localized computing solutions because virtual desktop/application execution takes place on a secure server instead of the more vulnerable user device. For example, with virtual desktops/applications, malicious software on a client user device may be prevented from compromising or infiltrating sensitive applications/resources on the secure server since the client device only has access to the desktop/application UI (user interface) streamed to it from the server. Whereas, desktops and applications executing locally on user devices may be more vulnerable to malicious software that infects such devices. In addition, virtual desktop/application deployments typically implement additional sophisticated layers of security, such as firewalls, antivirus applications, reverse proxies (such as UAG (Unified Access Gateway)), etc., to provide further protection.

However, despite the higher level of security afforded by virtualization, virtual desktops and applications may still be vulnerable to certain types of threats, such as keylogging or keyboard hooking. In such an attack, malware on a user device can see and capture what a user is typing and transmit this information to the attacker. Thus, when the malware is installed on a client device used to access a virtual desktop/application, the attacker may gain access to sensitive information inputted by the user, such as passwords, messages, etc.

What is needed is a way to protect virtual desktops and virtual applications from keylogging attacks.

DETAILED DESCRIPTION

Figure 1:
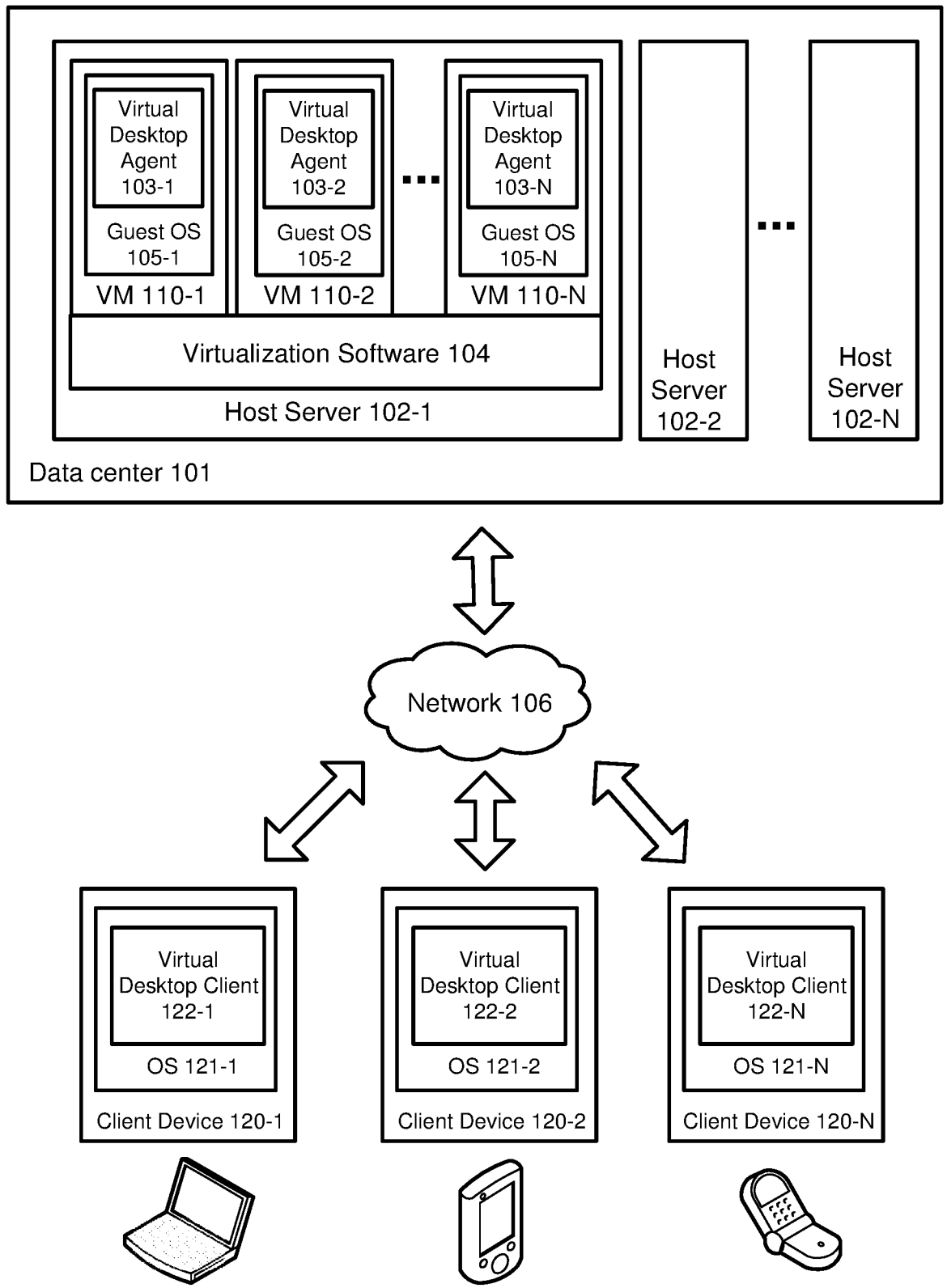
FIG. 1 illustrates an example of a virtual desktop environment, in accordance with various embodiments.

Systems and methods in accordance with various embodiments of the present disclosure overcome at least some of the above-mentioned shortcomings and deficiencies by providing more efficient ways to protect client devices in communication with virtual desktops and virtual applications from keylogging attacks. In particular, embodiments described herein leverage a keyboard filter driver that obfuscates scancodes from key presses produced on the keyboard of a client device so that malicious keylogging or keyboard hooking software is not able to observe the user's keyboard inputs. The obfuscated scancodes are conveyed and de-obfuscated before being applied in the virtual desktop or virtual application.

Generally, computer keyboards send data to identify and report which keys have been pressed by the user. To achieve this, a scancode (or scan code) is assigned to each key on the keyboard. When a key is pressed, a corresponding scancode is sent by the keyboard to report the key press. The scancode can be a number or a sequence of numbers. The present invention is directed towards systems and methods for obfuscating or obscuring these scancodes on client devices, to prevent potential keylogging malware from seeing user inputs.

The process can begin with the user setting focus on the virtual desktop or virtual application in the window of the client application running on the user's physical client device, for example, by clicking on the window. The client application can be a virtualization client running on the user's device with the primary role of rendering the user interface of the remote application or remote desktop executing on the server and conveying user inputs from the user device to the remote application or remote desktop.

Once focus is set on the client application window, the client application can send a control message to the keyboard filter driver instructing it to begin obfuscating scancodes from the keyboard. Generally, the keyboard filter driver would operate in a secure area that would not be easily accessible to malware, such as in kernel space. Consequently, any time the user presses a key on the keyboard while focus is on the client application window, the keyboard filter driver can obfuscate the produced scancode for the key press. The obfuscation can utilize various types of algorithms or encryption methods to obscure the real scancodes produced on the keyboard. For example, the obfuscation can be done by adding a number (a "salt") to the scancode, or by using cryptography (e.g., public key cryptography), as will be discussed in more detail below.

In various embodiments, the keyboard filter driver can send the obfuscation key (for enabling de-obfuscation of the obfuscated scancodes) to the client application. The obfuscated scancode keys can then be de-obfuscated before being processed in the virtual desktop or virtual application. In an embodiment, the scancodes can be de-obfuscated by the client application using the obfuscation key received from the keyboard filter driver. In another embodiment, the scancode de-obfuscation can take place on the host server (e.g., in the virtual desktop or application), in which case the client application can send the obfuscation key to the host server. As a result, if malware on the client device is watching user keyboard inputs, it may only see obfuscated scancodes.

Once the user changes focus away from the client application window (e.g., by clicking on another window, the client application can send a control message to the keyboard filter driver to stop performing scancode obfuscation. When the user returns again to the client application window, the process repeats. In various embodiments, the keyboard filter driver can generate a new, different obfuscation key for performing the obfuscation each time it is instructed to begin obfuscation, in order to enhance security (i.e., each time a user leaves the window and returns to it, a new obfuscation code can be generated by the keyboard filter driver).

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

With virtual applications, instead of providing a user with a full desktop session, i.e., where the user gets to see and interact with the entire desktop, the user can be given access to a single particular application on the desktop, so that he or she is able to see and interact with the application and not with other parts of the virtual desktop, which can be hidden from the user. This approach is preferable, for example, when an enterprise wishes to deliver access to a particular application to users, without giving access to the remainder of the computing environment where the application runs. This type of session is referred to as a "virtual application", "remote application", or an "application session" throughout this disclosure and these terms may be used interchangeably. Hence, with a virtual application, the application can run inside a remote desktop but look and feel to the user on his or her client device as if only the application is executing. Behind the scenes, however, the application can be running inside a desktop session, but only the application's user interface (UI) may be visible and accessible to the user on the client device. As in a full desktop session, with virtual applications user inputs can be conveyed from the client device to the remote desktop and redirected to the operating system (OS) of the remote desktop, so that the OS can deliver the inputs to the application, while the GUI of the application is streamed back and displayed on the client device.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

As mentioned previously, a virtual application session can be considered a virtual desktop session in which user access is restricted to the particular application. In various embodiments, an environment such as the example illustrated in FIG. 1 can be used for deployment of a virtual application. For example, the virtual application can be installed on the guest OS (e.g., 105-1, 105-2, 105-N) of a VM (e.g., 110-1, 110-2, 110-N) and a user of the client device (e.g., 120-1, 120-2, 120-N) can access and interact with the application via the virtual desktop client (e.g., 122-1, 122-2, 122-N) and virtual desktop agent (e.g., 103-1, 103-2, 103-N) in the same way as described above in the context of virtual desktop sessions. However, in the case of the virtual application session, the user can be restricted to interacting with only the application and may be blocked from interacting with or viewing other portions of the virtual desktop. Similar to provision of virtual desktops, user inputs on the client device (e.g., 120-1, 120-2, 120-N) can be routed to the application and the application UI can be streamed to the virtual desktop client (e.g., 122-1, 122-2, 122-N) and presented to the user.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
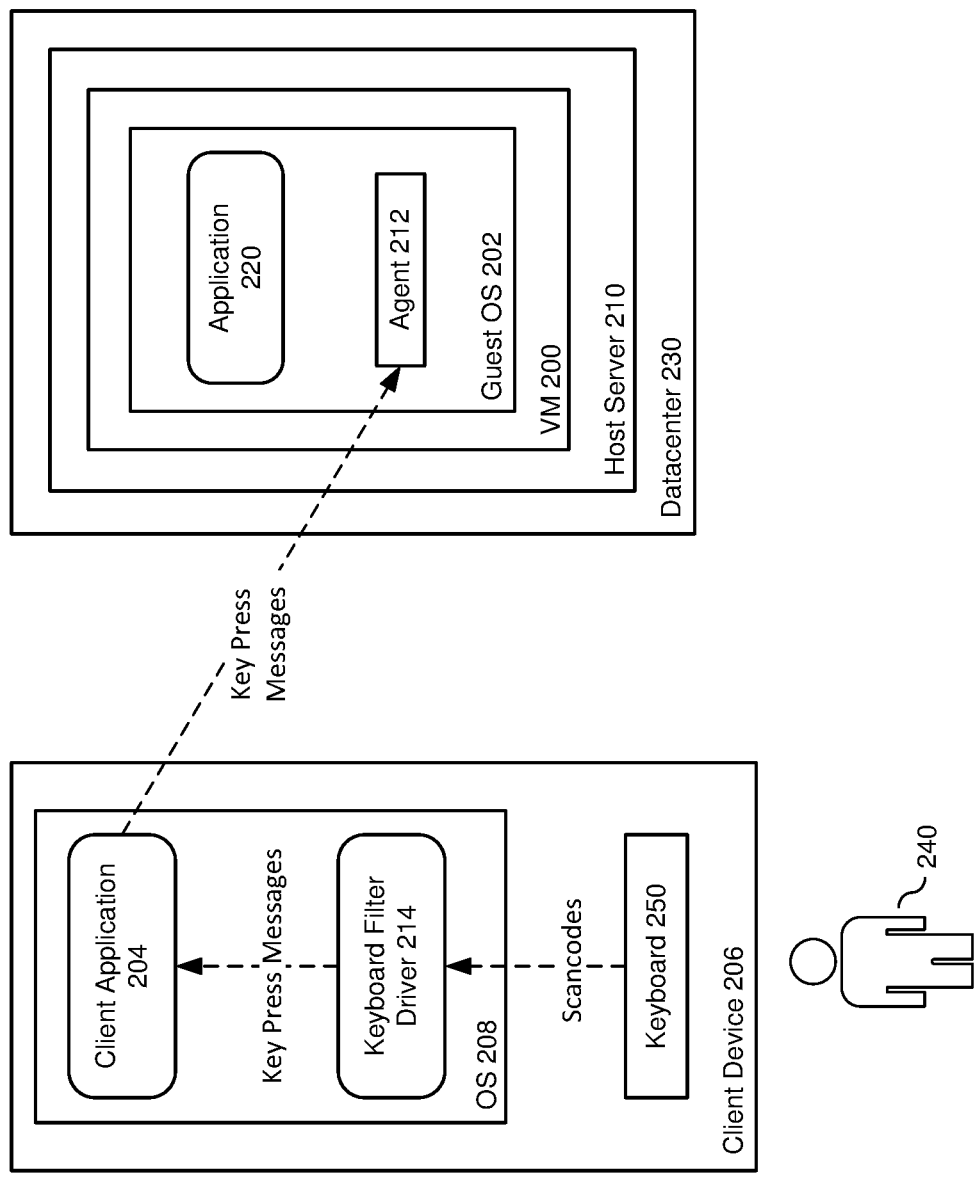
FIG. 2 illustrates an example architecture of a system for secure virtual desktops and virtual applications with anti-keylogging capabilities, in accordance with various embodiments.

FIG. 2 illustrates an example architecture of a system for secure virtual desktops and virtual applications with anti-keylogging capabilities, in accordance with various embodiments. As illustrated in the example of FIG. 2, a virtual machine (VM) 200 can run on a host server 210 in a datacenter 230 to provide a virtual desktop that is presented by a guest OS 202 to a user 240 of a remote client device 206 connected to the VM 200 over a network. The VM 200 further contains an application 220 installed in the guest OS 202, which can be accessed by the user in the virtual desktop. The datacenter 230 may be an on-premises datacenter of an enterprise or a cloud-based datacenter. While only one VM 200 is illustrated in this example, a real-world implementation would include multiple VMs hosted on the server 210, which may be accessed by different users on multiple client devices, as in the example of FIG. 1.

The client device 206 can execute a client application 204. The interaction between the virtual desktop and the client device 206 can be facilitated by the client application 204 running in the OS 208 on the client device 206, which communicates with a server-side agent 212 that is running on the guest OS 202 inside the virtual machine 200. In particular, the interaction can be performed by the agent 212 transmitting encoded visual display information (e.g., framebuffer data) over the network to the client application 204 and the client application 204 in turn transmitting user input events (e.g., keyboard, mouse events) to the agent 212.

In various embodiments, the example system illustrated in FIG. 2 can be configured to provision the user 240 with the entire virtual desktop (i.e., access to substantially the entire computing environment presented by the OS 202 on the VM 200). In other embodiments, the example system illustrated in FIG. 2 can be configured to provision a virtual application 220. In embodiments where the entire virtual desktop is provisioned, the user can be allowed to interact with the entire environment presented by the guest OS 202, including any applications (e.g., 220) installed on the guest OS 202. The GUI of the virtual desktop can be transmitted by the agent 212 to the client application 204 to be displayed in a window of the client application 204 on the client device 206. User inputs into virtual desktop can be transmitted by the client application 204 to the agent 212 and passed to the guest OS 202 to be performed in the virtual desktop.

In embodiments where only a virtual application 220 is provisioned, the user can be allowed to interact with and view the virtual application 220 running in the guest OS 202, while being restricted from other portions of the computing environment. In this case, the GUI of the application 220 can be transmitted by the agent 212 to the client application 204 to be displayed in the window of the client application 204 on the client device 206. User inputs into the application 220 can be transmitted by the client application 204 to the agent 212 and passed to the guest OS 202 to be applied in the application 220.

The anti-keylogging features described herein function independently of whether a virtual desktop or a virtual application is being provisioned and therefore the descriptions provided herein should be understood as being applicable to both virtual desktops and virtual applications. For the sake of being concise, the following description may describe the invention in the context of being applied to just a virtual desktop or just a virtual application. However, it should be understood that the invention is equally applicable to virtual applications and virtual desktops, and therefore descriptions in the context of virtual desktops or virtual applications should be understood to apply to both virtual desktop and virtual application deployments.

The client device further contains a keyboard 250, which may be any device (external or integrated) for allowing the user 240 to enter keys into the client device 206. With past technologies, when the user 240 pressed a key on the keyboard 250, a scancode corresponding to the pressed key was produced and a key press message containing the scancode was conveyed to whichever application had keyboard focus on the client device 206 at the time, so that the keyboard input can be performed in that application. Hence, if the client application 204 had focus, the key press message containing the scancode would be conveyed to the client application 204, which would subsequently convey the key press message to the virtual desktop/application in communication with the client application 204. Thus, if keylogging or keyboard hooking malware was present on client device 206, it could potentially see and read the user's 240 keyboard entries. As will be described in more detail below, the present invention aims to remedy such vulnerabilities to keylogging attacks in past technologies by obfuscating the keyboard scancodes.

The process can begin when the focus on the client device 206 is set on the window of the client application 204 containing the virtual desktop (or, in the case of a virtual application, containing the application 220). For example, the user 240 may perform a mouse click on the window or touch the window with a finger on a touchscreen to set focus on the client application 204 window. In response to the user 240 input to set focus on the client application 204 window, the OS 208 can send a message to the client application 204, indicating that focus is on the client application 204 window. For example, in a Microsoft Windows operating system, available from Microsoft Corporation, the OS 208 can send a WM_SETFOCUS message to the client application 204 to notify it that it has focus.

In various embodiments, when the client application 204 receives the message that its window has focus, it can send a control message to a keyboard filter driver 214 running on the OS 208 of the client device 206, instructing it to begin obfuscating key press scancodes. In various embodiments, the control message can be a function call or an IOCTL ("input/output control") call. Consequently, when the user presses a keyboard key, the keyboard filter driver 214 (which can observe all keyboard key presses) can obfuscate the generated scancode. For example, the keyboard filter driver can intercept the scancode produced from the key press and apply whatever obfuscation technique or algorithm it uses (to be discussed further below) to change or obscure the scancode. The obfuscated scancode can then be included in a key press message (which can be a message indicating that the particular key was pressed) that is sent to the client application 204. For example, the key press message with the obfuscated scancode can be placed in the client application 204 message queue, form where it can be retrieved by the client application 204 message pump for processing. In this way, going forward from the time it is instructed to begin obfuscation, the keyboard filter driver 214 can continue to obfuscate key presses produced on the keyboard 250, until it is instructed to stop performing the obfuscation.

For example, in the Windows OS environment, the client application 204 window can have a message pumping mechanism. This message pumping mechanism can be per thread. For each keyboard key press, the Windows OS can send a key press message to the client application. The key press message can be placed in a queue for processing by the client application 204. A GetMessage function can retrieve the message from the main UI thread's message queue and construct a message structure that is later dispatched to the corresponding window (Windows GUI subsystem appends the message to the UI thread's message queue). The message structure can contain the message instruction (message id WM_KEYDOWN for the key press and wParam of WM_KEYDOWN containing the pressed key scancode (the scancode can be obfuscated)).

In various embodiments, the keyboard filter driver 214 can be located in a secure area on the client device 206 where it is not easily accessible to potential malware. For example, the keyboard filter driver 214 can be located in kernel space. Thus, any keylogging malware located above the keyboard filter driver 214 and before the components where the scancodes are de-obfuscated, would only see obfuscated scancodes. For example, if the scancodes are de-obfuscated in the client application 204, then any malware between the keyboard filter driver 214 and the client application 204 would only see obfuscated scancodes. This way, the attack surface in greatly reduced as the attacker would need to have its own components below the keyboard filter driver 214 to see the actual key scancodes.

The obfuscation by the keyboard filter driver 214 can be performed in a variety of ways. In an embodiment, the obfuscation can be performed by adding a number or "salt" to the key press scancode to obfuscate it. The salt can be generated by the keyboard filter driver. The salt can also be different (e.g., it can be randomly generated) every time focus is set on the client application 206 (to further enhance security). Hence, each time the user clicks on another application window and comes back to the client application 204 again, a different salt can be generated.

A variety of obfuscation methods can be used in other embodiments. For example, the keyboard filter driver 214 can apply an algorithm to obfuscate (i.e., change and obscure) the scancode. In other embodiments, the keyboard filter driver 214 can use encryption methods to obfuscate the scancode, such as public key cryptography.

In various embodiments, the component performing the de-obfuscation can be provided with an obfuscation key (as applicable) to enable de-obfuscation of the obfuscated scancodes. For example, if obfuscation is performed using a salt, then the salt itself (the number) can be the obfuscation key, and the de-obfuscation component would subtract the salt from the obfuscated scancodes to de-obfuscate them.

If the obfuscation is performed using an algorithm, then the obfuscation key can contain any information necessary to reverse the algorithm and recover the true scancode. If the obfuscation is performed using cryptography, then the obfuscation key can be a cryptographic key necessary to decrypt the encoded scancodes.

Thus, before key press messages containing the obfuscated scancode are processed in the virtual desktop or application running on the VM 200, the obfuscated scancode can be de-obfuscated in different components of the system. In one embodiment, the de-obfuscation can take place on the client device 206 itself, e.g., in the client application 204. In this case, when keys are pressed on the keyboard 250, the keyboard filter driver 214 can obfuscate corresponding produced scancodes. Then, key press message containing the obfuscated scancodes can be conveyed to the client application 204. In various embodiments, the keyboard filter driver 214 can generate and send the obfuscation key to the client application 214 in response to (as a return for) the control message (IOCTL) instructing the keyboard filter driver 214 to start obfuscation after the client application 214 gets focus. The client application 204 can then use the received obfuscation key to de-obfuscate the scancodes in the key press messages and convey the key press messages with the true scancodes to the virtual desktop/application, to be applied there. In various embodiments, until the client application 204 loses focus, all subsequent scancodes in key press messages can be obfuscated and de-obfuscated using this obfuscation key. When the client application 204 window loses focus and gets focus again, it can again request the keyboard filter driver 214 to start obfuscation. In response, the keyboard filter driver 214 can generate and send a new obfuscation key to the client application 204.

In another embodiment, the de-obfuscation can take place on the server 210 (e.g., in the VM 200, in the virtual desktop/virtual application, in the guest OS 202, or in the agent 212). In this case, when keys are pressed on the keyboard 250, the keyboard filter driver 214 can obfuscate corresponding produced scancodes. Then, key press message containing the obfuscated scancodes can be conveyed to the client application 204, which can then convey the key press message with the obfuscated scancodes to the server 210. In various embodiments, the keyboard filter driver 214 can send the obfuscation key to the client application 214 in response to (as a return for) the control message (IOCTL) instructing the keyboard filter driver 214 to start obfuscation after the client application 214 gets focus. The client application 214 can then send the obfuscation key to the server 210. On the server 210, the received obfuscation key can be used to de-obfuscate the scancodes in key press messages and the key press messages with the true scancodes can be applied in the virtual desktop/virtual application. In various embodiments, until the client application 204 loses focus, all subsequent scancodes in key press messages can be obfuscated and de-obfuscated using this obfuscation key. When the window loses focus, the client application 204 can instruct the server 210 to clear the obfuscation key (this clearing can happen when the session disconnects/reconnects also). When the client application 204 window gets focus again after losing focus, it can again request the keyboard filter driver 214 to start obfuscation. In response, the keyboard filter driver 214 can generate and send a new obfuscation key to the client application 204, which can then forward the new obfuscation key to the server 210.

In embodiments where the obfuscation key is periodically changed (e.g., when a new salt is generated each time focus is reset on the client application 206), the new obfuscation key can be supplied to the de-obfuscating component each time after it is generated. For example, in a system where obfuscation is performed using a salt, and de-obfuscation is performed in the client application 204, when the user sets focus on the client application 204 window, the keyboard filter driver 214 can generate a salt (e.g., randomly) and convey the salt (which would be the obfuscation key) to the client application 204 (If the de-obfuscation was performed in a different location, then the keyboard filter driver 214 would send the salt to that location). When keys are pressed on the keyboard 250, the keyboard filter driver 214 can obfuscate corresponding produced scancodes using the generated salt. Then, key press message containing the obfuscated messages can be conveyed to the client application 204. The client application 204 can use the received obfuscation key to de-obfuscate the scancodes in the key press messages and convey the key press messages with the true scancodes to the virtual desktop/application for processing. For example, in a Windows OS environment, after the GetMessage function retrieves a key press message and before the key press message is dispatched to the virtual desktop, the scancode in the key press message can be de-obfuscated using the salt received from keyboard filter driver 214 (e.g., this can be performed in the client application 204).

In various embodiments, when focus leaves the client application 204 window, a message can be sent to the keyboard filter driver 214 instructing it to stop obfuscating keyboard scancodes. For example, when focus leaves the client application 204 window (e.g., user clicks on another window), the OS 208 can send a message to the client application 204 informing it that it does not have focus, and the client application 204 can in turn send a control message to the keyboard filter driver 214 instructing it to stop performing obfuscation. In various embodiments, the control message can be a function call or an IOCTL ("input/output control") call. Once the keyboard filter driver 214 receives the control message, it can stop obfuscating scancodes from that point forward, until it is instructed to begin obfuscation again (at which point, it may generate a new obfuscation key if applicable, as discussed above). For example, in the Windows OS system, the OS 208 can send a WM_KILLFOCUS message to the client application 204 when its window loses the focus, and the client application 204 can then (in response) send a control message to the keyboard filter driver 214 instructing it to stop performing obfuscation.

Thus, when the virtual application 220 or desktop window gets focus, the keyboard filter driver 214 can be instructed to start scancode obfuscation, and when it loses focus (e.g., when user clicks anywhere outside the window), the keyboard filter driver 214 can be instructed to stop obfuscation. This way, key press scancodes for other applications (i.e., other than the virtual desktop/virtual application) are not obfuscated.

As mentioned above, in an embodiment, the system can use public key encryption or public key infrastructure (PKI) to obfuscate scancodes. In this case, the keyboard filter driver 214 can obfuscate scancodes by encrypting them using a public key (e.g., the public key may be made aware to the client device 206), and de-obfuscation can be performed on the server 210 (for example, in the VM 200, in the virtual desktop/application, in the guest OS 202, or in the agent 212) by decrypting the scancodes using the private key (which may only be known to the server 210). Thus, when keys are pressed on the keyboard 250, the keyboard filter driver 214 can obfuscate corresponding produced scancodes by encrypting them with the public key, and key press message containing the obfuscated scancodes can be conveyed to the client application 204, which can then convey the key press message with the obfuscated scancodes to the server 210. On the server 210, the private key can be used to de-obfuscate (i.e., decrypt) the scancodes in the key press messages (e.g., by the virtual desktop, guest OS 202, VM 200, agent 212, etc.) and the key press messages with the true scancodes can be applied in the virtual desktop/application.

In various embodiments, additional features can be implemented to ensure that the system, and particularly the keyboard filter driver 214, is not compromised by attackers. One potential area of concern is if an unauthorized application sends a control message (e.g., an IOCTL) to the keyboard filter driver 214 and stops obfuscation. For example, after a the virtual desktop/application in the client application 204 gets focus and obfuscation is started, a malicious application may attempt to send a control message (IOCTL) to the keyboard filter driver 214 and stop obfuscation, even though the user has not clicked outside the client application 204 window to take away focus. Then, the malicious code may be able to hook the keyboard and capture data inputted by the user. To prevent this, the keyboard filter driver 214 can be configured to accept such control messages only from the client application 204 process, for which the keyboard filter driver 214 may need to know the process ID of the client application 204 processes. There are multiple ways to address this vulnerability. In one embodiment, a hash (e.g., a checksum) of the client application 204 executable file can be baked or hardcoded into (i.e., stored in) the keyboard filter driver 214, so that the keyboard filter driver 214 can confirm the signature of the application that sent the control message. Then, the keyboard filter driver 214 can accept control messages only when accompanied with this hash (e.g., the control message needs to be sent from a process with an executable file hash matching the one stored in the keyboard filter driver 214 to be accepted by the keyboard filter driver 214). The keyboard filter driver 214 doesn't necessarily need to calculate the hash for every control message, instead it can keep a list of PIDs (Process Identifiers) with matching client application 204 executable hashes.

While hardcoding the client application 204 executable hash into the keyboard filter driver 214 can make it secure, the approach can be susceptible to version conflicts. For example, version 1 of the client application 204 may not work with version 2 of the keyboard filter driver 214, if the hash hardcoded into the driver 214 is different than the actual hash of the client application 204 executable. In another approach, instead of hardcoding the hash at the driver 214, the client application 204 installer can keep a hash in the HKLM (HKEY_LOCAL_MACHINE) path, where only the administrator can make modifications. The keyboard filter driver 214 can read this hash at load time and only accept the control messages from applications with this hash. However, this approach may be less secure if malicious code with elevated privileges is able to modify this hash at the HKLM.

Figure 3:
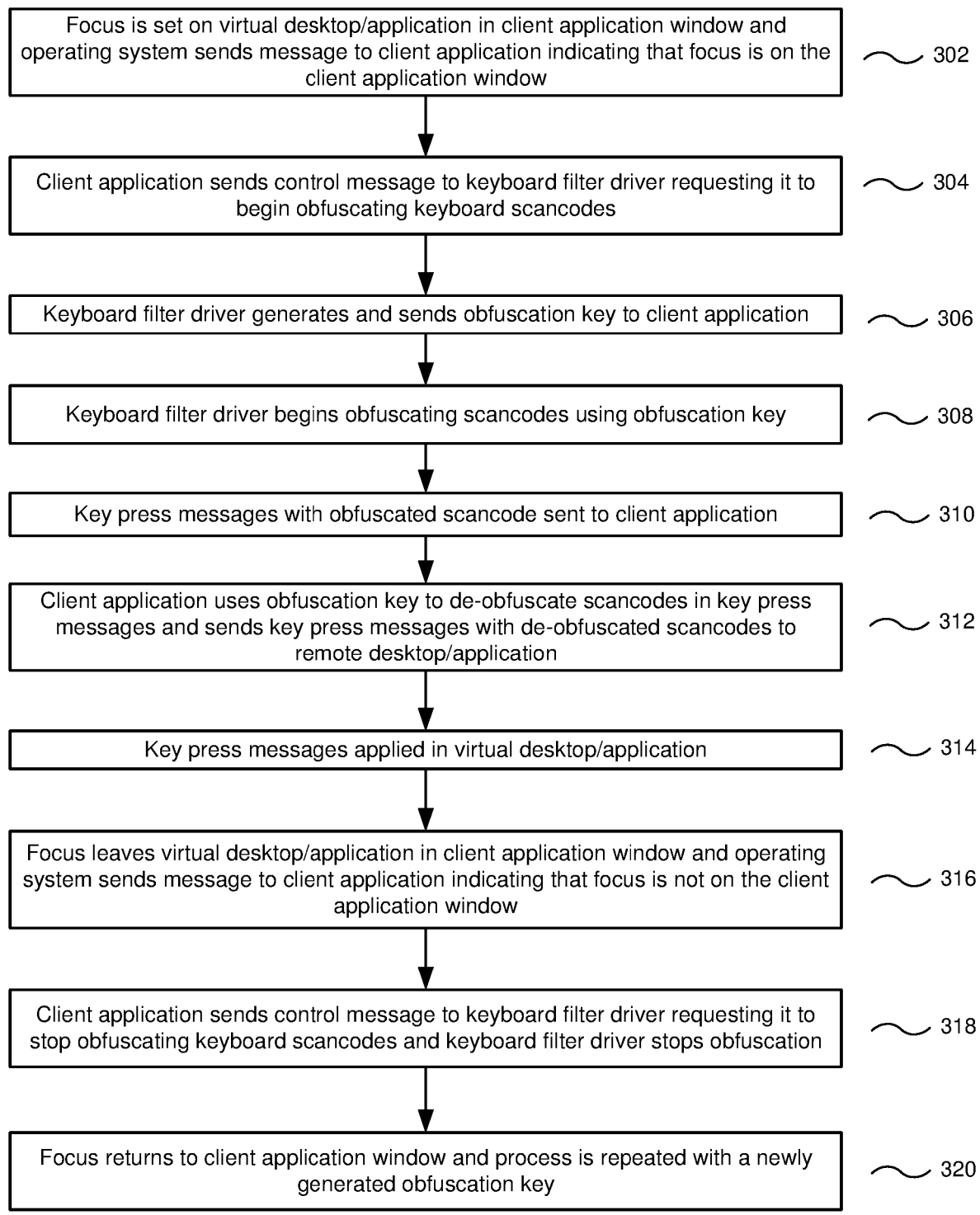
FIG. 3 illustrates an example process flow for secure virtual desktops and virtual applications with anti-keylogging capabilities, in accordance with various embodiments.

FIG. 3 illustrates an example process flow for secure virtual desktops and virtual applications with anti-keylogging capabilities, in accordance with various embodiments. In operation 302, the focus is set on the virtual desktop/application in the client application window on the client device, and the operating system sends a message to the client application indicating that focus is on the client application window. For example, a user can set the focus by clicking on the client application window and the operating system can send a WM_SETFOCUS message to the client application (in a Windows OS). In operation 304, the client application sends a control message to a keyboard filter driver on the client device requesting it to begin obfuscating keyboard scancodes.

In operation 306, the keyboard filter driver generates and sends an obfuscation key to the client application (e.g., as a return for the control message sent in operation 304). For example, the keyboard filter driver can randomly generate a salt and send it to the client application. In operation 308, the keyboard filter driver begins obfuscating scancodes using the obfuscation key. For example, the keyboard filter driver can intercept scancodes produced from user key presses on the keyboard and obfuscate the scancodes by adding the salt.

In operation 310, key press messages with the obfuscated scancode are sent to the client application. In operation 312, the client application uses the received obfuscation key to de-obfuscate scancodes in the received key press messages and sends the key press messages with the de-obfuscated scancodes to the remote desktop/application.

In operation 314, the key press messages with the de-obfuscated scancodes are applied in the virtual desktop/application. That is, the key press messages are carried out in the virtual desktop/application. In operation 316, the focus leaves the virtual desktop/application in the client application window and the operating system sends a message to the client application indicating that focus is not on the client application window. For example, the user may click somewhere other than the client application window, causing the window to lose focus, and the operating system can send a WM_KILLFOCUS message to the client application (in a Windows OS). In operation 316, the client application sends a control message to the keyboard filter driver requesting it to stop obfuscating keyboard scancodes and the keyboard filter driver stops performing obfuscation.

In operation 320, when focus returns to the client application window, the process is repeated with a newly generated obfuscation key. That is, once focus returns, the operating system again sends a message to the client application indicating that focus is on the client application window, and the client application sends a control message to the keyboard filter driver on the client device requesting it to begin obfuscating keyboard scancodes. The keyboard filter driver then generates a new, different obfuscation key (a new salt), sends it to the client application, and the process repeats with the new obfuscation key.

Figure 4:
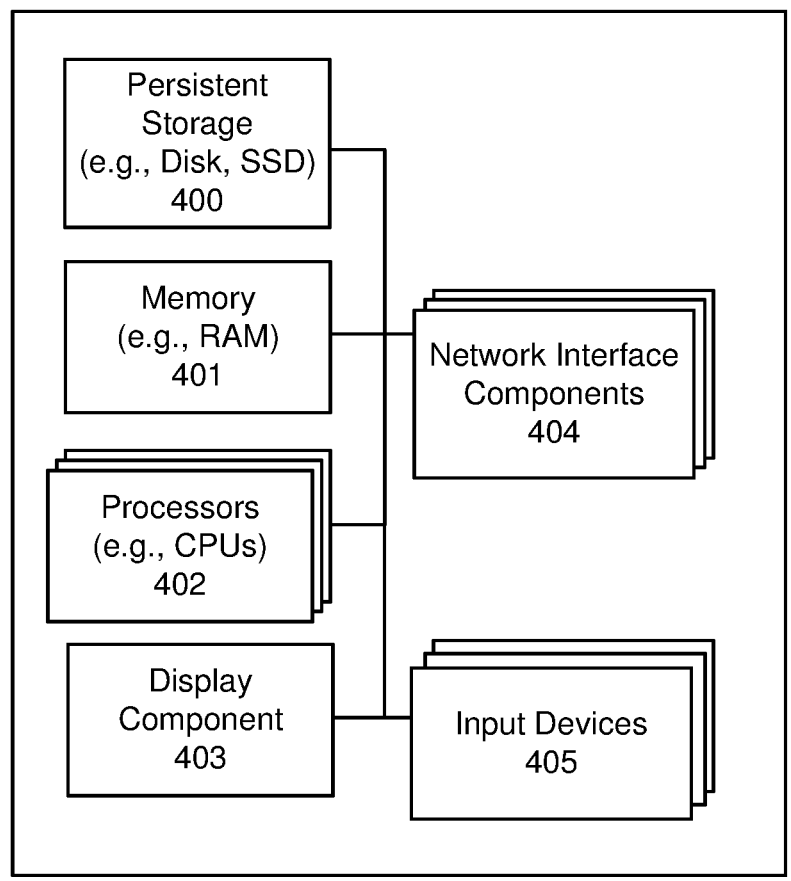
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for securing keyboard inputs on a client device executing a client application for accessing a virtual desktop or virtual application hosted on a remote server, comprising:
   in response to the client application having focus on the client device, by a keyboard filter driver operating on the client device, generating a random obfuscation key and obfuscating a scancode corresponding to a key press input received on the client device using the generated obfuscation key;
   transmitting a key press message containing the obfuscated scancode to the client application;
   by the keyboard filter driver, conveying the generated obfuscation key to the client application;
   transmitting the key press message by the client application to the virtual desktop or virtual application;
   processing the key press message in the virtual desktop or virtual application, wherein the obfuscated scancode in the key press message is de-obfuscated using the conveyed generated obfuscation key prior to processing the key press message in the virtual desktop or virtual application; and
   wherein the keyboard filter driver generates a new random obfuscation key each time focus is set on the client application and conveys the new obfuscation key to the client application.

2. The method of claim 1, further comprising:
   detecting that the client application has focus and, in response, sending a control message to the keyboard filter driver instructing it to begin obfuscating keyboard scancodes; and
   detecting that the client application lost focus and, in response, sending a control message to the keyboard filter driver instructing it to stop obfuscating keyboard scancodes.

3. The method of claim 1, wherein the obfuscation is performed by adding a number to the scancode.

4. The method of claim 1, wherein:
   the client application de-obfuscates the obfuscated scancode in the key press message using the obfuscation key; and
   the client application conveys the key press message with the de-obfuscated scancode to the virtual desktop or virtual application.

5. The method of claim 1, wherein:
the client application conveys the obfuscation key to the virtual desktop or virtual application; and
the virtual desktop or virtual application de-obfuscates the obfuscated scancode in the key press message using the obfuscation key.

6. The method of claim 1, wherein the obfuscation and de-obfuscation of the scancode is performed using public key cryptography.

7. The method of claim 1, wherein the keyboard filter driver performs the scancode obfuscation using an obfuscation key, and wherein the keyboard filter driver generates a different obfuscation key each time focus is set on the client application window.

8. A computing device for securing keyboard inputs on a client device executing a client application for accessing a virtual desktop or virtual application hosted on a remote server, comprising:
at least one processor; and
memory including instructions that, when executed by the at least one processor, cause the computing device to perform the steps of:
in response to the client application having focus on the client device, by a keyboard filter driver operating on the client device, generating a random obfuscation key and obfuscating a scancode corresponding to a key press input received on the client device using the generated obfuscation key;
transmitting a key press message containing the obfuscated scancode to the client application;
by the keyboard filter driver, conveying the generated obfuscation key to the client application;
transmitting the key press message by the client application to the virtual desktop or virtual application; and
processing the key press message in the virtual desktop or virtual application, wherein the obfuscated scancode in the key press message is de-obfuscated using the conveyed generated obfuscation key prior to processing the key press message in the virtual desktop or virtual application; and
wherein the keyboard filter driver generates a new random obfuscation key each time focus is set on the client application and conveys the new obfuscation key to the client application.

9. The computing device of claim 8, wherein the memory further includes instructions that when executed by the at least one processor, cause the computing device to perform the steps of:
detecting that the client application has focus and, in response, sending a control message to the keyboard filter driver instructing it to begin obfuscating keyboard scancodes; and
detecting that the client application lost focus and, in response, sending a control message to the keyboard filter driver instructing it to stop obfuscating keyboard scancodes.

10. The computing device of claim 8, wherein the obfuscation key is performed by adding a number to the scancode.

11. The computing device of claim 8, wherein:
the client application de-obfuscates the obfuscated scancode in the key press message using the obfuscation key; and
the client application conveys the key press message with the de-obfuscated scancode to the virtual desktop or virtual application.

12. The computing device of claim 8, wherein:
the client application conveys the obfuscation key to the virtual desktop or virtual application; and
the virtual desktop or virtual application de-obfuscates the obfuscated scancode in the key press message using the obfuscation key.

13. The computing device of claim 8, wherein the obfuscation and de-obfuscation of the scancode is performed using public key cryptography.

14. The computing device of claim 8, wherein the keyboard filter driver performs the scancode obfuscation using an obfuscation key, and wherein the keyboard filter driver generates a different obfuscation key each time focus is set on the client application window.

15. A non-transitory computer readable storage medium for securing keyboard inputs on a client device executing a client application for accessing a virtual desktop or virtual application hosted on a remote server, comprising one or more sequences of instructions, the instructions when executed by one or more processors causing the one or more processors to execute the operations of:
in response to the client application having focus on the client device, by a keyboard filter driver operating on the client device, generating a random obfuscation key and obfuscating a scancode corresponding to a key press input received on the client device using the generated obfuscation key;
transmitting a key press message containing the obfuscated scancode to the client application;
by the keyboard filter driver, conveying the generated obfuscation key to the client application;
transmitting the key press message by the client application to the virtual desktop or virtual application; and
processing the key press message in the virtual desktop or virtual application, wherein the obfuscated scancode in the key press message is de-obfuscated using the conveyed generated obfuscation key prior to processing the key press message in the virtual desktop or virtual application; and
wherein the keyboard filter driver generates a new random obfuscation key each time focus is set on the client application and conveys the new obfuscation key to the client application.

16. The non-transitory computer readable storage medium of claim 15, further comprising instructions that when executed by the one or more processors cause the one or more processors to execute the operations of:
detecting that the client application has focus and, in response, sending a control message to the keyboard filter driver instructing it to begin obfuscating keyboard scancodes; and
detecting that the client application lost focus and, in response, sending a control message to the keyboard filter driver instructing it to stop obfuscating keyboard scancodes.

17. The non-transitory computer readable storage medium of claim 15, wherein the obfuscation key is performed by adding a number to the scancode.

18. The non-transitory computer readable storage medium of claim 15, wherein:
the client application de-obfuscates the obfuscated scancode in the key press message using the obfuscation key; and
the client application conveys the key press message with the de-obfuscated scancode to the virtual desktop or virtual application.

19. The non-transitory computer readable storage medium of claim 15, wherein:
the client application conveys the obfuscation key to the virtual desktop or virtual application; and
the virtual desktop or virtual application de-obfuscates the obfuscated scancode in the key press message using the obfuscation key.

20. The non-transitory computer readable storage medium of claim 15, wherein the obfuscation and de-obfuscation of the scancode is performed using public key cryptography.

* * * * *